(12) United States Patent
Tappan et al.

(10) Patent No.: US 10,896,289 B2
(45) Date of Patent: Jan. 19, 2021

(54) EVENT LIST MANAGEMENT SYSTEM (71) Applicant: Bently Nevada, LLC, Minden, NV (US)

(72) Inventors: Jacqueline Marie Tappan, Minden, NV (US); Ryan Roaldson, Minden, NV (US)

(73) Assignee: BENTLY NEVADA, LLC, South Minden, NV (US)

( * ) Notice: Subject to any disclaimer, the term of this patent is extended or adjusted under 35 U.S.C. 154(b) by 360 days.

(21) Appl. No.: 15/787,642

(22) Filed: Oct. 18, 2017

(65) Prior Publication Data

US 2019/0114315 A1    Apr. 18, 2019

(51) Int. Cl.
*G06F 40/00* (2020.01)
*G06F 40/177* (2020.01)
*G01M 99/00* (2011.01)
*G05B 23/02* (2006.01)
*G06F 3/0481* (2013.01)
*G06F 16/903* (2019.01)

(52) U.S. Cl.
CPC ......... *G06F 40/177* (2020.01); *G01M 99/008* (2013.01); *G05B 23/0272* (2013.01); *G06F 3/04817* (2013.01); *G06F 16/903* (2019.01)

(58) Field of Classification Search
None
See application file for complete search history.

(56) References Cited

U.S. PATENT DOCUMENTS 5,581,242 A     12/1996  Arita et al.
5,631,851 A      5/1997  Tanaka et al.
(Continued)

FOREIGN PATENT DOCUMENTS

CN       106292496 A       1/2017
JP       2009070331 A      4/2009
(Continued)

OTHER PUBLICATIONS

Alarm Status—Shelving, Ignition User Manual 7.8, pp. 1-5, Sep. 26, 2017.
(Continued)

*Primary Examiner* — Gurkanwaljit Singh
(74) *Attorney, Agent, or Firm* — Mintz Levin Cohn Ferris Glovsky and Popeo, PC; Lisa Adams (57) ABSTRACT

Methods and systems are provided for event list management. In one embodiment, the method can include accessing data characterizing an operation of a machine. The data can include time durations of a plurality of events associated with the operation of the machine. The plurality of events can share a property. The method can include displaying a first view of the accessed data in a graphical display. The method can also include receiving data characterizing a user input indicative of a view change request. The method can further include determining an aggregate operation time and a number of occurrences of the plurality of events. The method can also include replacing, in the graphical display, the first view with a second view. The second view can include a single visual representation for the plurality of events. The single visual representation can include the determined aggregate operation time and the number of occurrences.

19 Claims, 9 Drawing Sheets

(56) References Cited

U.S. PATENT DOCUMENTS

| | | | |
|---|---|---|---|
| 6,690,274 B1* | 2/2004 | Bristol | G05B 23/0267 |
| | | | 340/506 |
| 7,876,211 B2 | 1/2011 | Granatelli et al. | |
| 8,264,339 B2 | 9/2012 | Okada | |
| 9,019,124 B2 | 4/2015 | Schiff et al. | |
| 9,311,603 B2 | 4/2016 | Martin et al. | |
| 9,311,810 B2 | 4/2016 | Downor | |
| 9,405,291 B2 | 8/2016 | Shame, Jr. et al. | |
| 9,633,552 B2 | 4/2017 | Janchookiat | |
| 2002/0083773 A1* | 7/2002 | Ben-Romdhane | ......... |
| | | | G01M 13/028 |
| | | | 73/660 |
| 2006/0179463 A1* | 8/2006 | Chisholm | G08B 13/19682 |
| | | | 725/90 |
| 2009/0201144 A1 | 4/2009 | Okada | |
| 2010/0076714 A1* | 3/2010 | Discenzo | H02N 2/185 |
| | | | 702/104 |
| 2010/0100037 A1 | 4/2010 | Cozmi et al. | |
| 2012/0084031 A1 | 4/2012 | Saito et al. | |
| 2012/0330577 A1 | 12/2012 | Kar | |
| 2013/0035992 A1* | 2/2013 | Silverman | G06Q 50/06 |
| | | | 705/14.1 |
| 2013/0103353 A1 | 4/2013 | Klöppner | |
| 2013/0213344 A1* | 8/2013 | Stender | F02D 45/00 |
| | | | 123/198 D |
| 2014/0055274 A1 | 2/2014 | Hatch et al. | |
| 2014/0244006 A1 | 8/2014 | Lee | |
| 2015/0279177 A1* | 10/2015 | Hyde | G16H 50/20 |
| | | | 340/815.4 |
| 2016/0012609 A1* | 1/2016 | Laska | G06K 9/2081 |
| | | | 382/103 |
| 2016/0300475 A1 | 10/2016 | Childs et al. | |
| 2017/0003200 A1 | 1/2017 | McDowell et al. | |
| 2017/0046057 A1 | 2/2017 | Snuggerud et al. | |
| 2018/0018081 A1* | 1/2018 | Dattilo-Green | H04N 7/181 |
| 2018/0019889 A1* | 1/2018 | Burns | H04L 12/4625 |

FOREIGN PATENT DOCUMENTS

| | | |
|---|---|---|
| KR | 784030 B1 | 12/2007 |
| KR | 20140054682 A | 5/2014 |

OTHER PUBLICATIONS

Economic and Effective Alarm Management, Rockwell Automation, pp. 1-14, Jun. 2017.

* cited by examiner

| Status | Events | Case history | | | | |
|---|---|---|---|---|---|---|
| Alarms | System health | States | | | | |
| Path | Device | Type | Activity | Entered △ | Exited | Duration (D HH:MM:SS) | Count |
| Peaker power plant... | BPF3_3... | Not communicati... | Active | 08-8-2017 ... | | 2 Days, 08:45: ... | - |
| Peaker power plant... | BPF2_3... | Not communicati... | Active | 08-8-2017 ... | | 2 Days, 09:05: ... | - |
| Peaker power plant... | BPF3_3... | Configuration out ... | Cleared | 05-8-2017 ... | 06-8-2017 ... | 1 Days, 02:29: ... | - |
| Peaker power plant... | BPF3_3... | Not communicati... | Cleared | 31-7-2017 ... | 03-8-2017 ... | 4 Days, 00:17: ... | - |
| Peaker power plant... | - | Database wrapping | Active | 25-7-2017 ... | | 16 Days, 08:45: ... | - |

FIG. 6

| Status | Events | Case history | | | | |
|---|---|---|---|---|---|---|
| Alarms | System health | States | | | | |
| Path | Device | Type | Activity | Last entered △ | Last exited | Total Duration (D HH:MM:SS) | Total Count |
| Peaker power plant ... | BPF3_3... | Not communicati... | Active | 08-8-2017 ... | | 24 Days, 03:12: ... | 15 |
| Peaker power plant ... | BPF2_3... | Not communicati... | Active | 08-8-2017 ... | | 22 Days, 06:44: ... | 17 |
| Peaker power plant ... | BPF3_3... | Configuration out ... | Cleared | 05-8-2017 ... | 06-8-2017 ... | 10 Days, 12:33: ... | 12 |
| Peaker power plant ... | - | Database wrappin... | Active | 25-7-2017 ... | | 16 Days, 08:45: ... | 1 |
| Peaker power plant ... | BPF3_3... | Authentication fail... | Cleared | 22-7-2017 ... | 23-7-2017 ... | 5 Days, 02:12: ... | 4 |

| Status | Alarms | Events | Case history | | | | | | | 1 H D W M Y CV | | 🗔 📄 |
|---|---|---|---|---|---|---|---|---|---|---|---|---|
| | | System health | States | | | | | | | | | |
| Level | Machine | Point | Measurement | Type | Value | Trigger | Alarm set | State | Activity | Entered △ | Exited | Duration (DHH:MM:SS) | Count |
| ④ | Steam turbine | T/G #3 BRG VIB-X | Direct | Over | 9.991 mil pp | 9.800 mil pp | Standard | Running | Active | 10-8-2017 16:12:04 PM | | 0 Days, 06:45:11 | - |
| ③ | Steam turbine | T/G #3 BRG VIB-Y | Direct | Over | 9.129 mil pp | 5.000 mil pp | Standard | Running | Active | 10-8-2017 16:12:02 PM | | 0 Days, 06:45:11 | - |
| ② | Steam turbine | T/G #3 BRG VIB-Y | 1X Amp | Out of band | 7 mil pp | 3.5 / 6.5 mil pp | Standard | SUSD | Cleared | 15-7-2017 16:12:04 PM | 20-7-2017 13:09:31 PM | 4 Days, 21:05:51 | - |
| ② | Steam turbine | T/G #3 BRG VIB-Y | 1X Phase | Out of band | 115 Degrees | 0 / 108 Degrees | Standard | SUSD | Cleared | 15-7-2017 16:12:04 PM | 20-7-2017 13:09:31 PM | 4 Days, 21:05:51 | - |
| ④ | Steam turbine | T/G #3 BRG VIB-Y | Direct | Over | 12 mil pp | 10 mil pp | Standard | Running | Cleared | 09-7-2017 16:12:04 PM | 10-7-2017 12:44:56 PM | 0 Days, 20:15:11 | - |

| | | | | | | | | | | | |
|---|---|---|---|---|---|---|---|---|---|---|---|
| Status | Events | System health | States | | | | | | 1 H D W M Y CV | | |
| Alarms | Case history | | | | | | | | | | |
| Level | Machine | Point | Measurement | Type | Value | Trigger | Alarm set | State | Activity | Last Entered △ | Last Exited | Total Duration (DHH:MM:SS) | Total Count |
| ④ | Steam turbine | T/G #3 BRG VIB-X | Direct | Over | 9.991 mil pp | 9.800 mil pp | Standard | Running | Active | 10-8-2017 16:12:04 PM | | 9 Days, 02:12:09 | 12 |
| ③ | Steam turbine | T/G #3 BRG VIB-Y | Direct | Over | 9.129 mil pp | 5.000 mil pp | Standard | Running | Active | 10-8-2017 16:12:02 PM | | 8 Days, 03:13:25 | 11 |
| ② | Steam turbine | T/G #3 BRG VIB-Y | 1X Amp | Out of band | 7 mil pp | 3.5 / 6.5 mil pp | Standard | SUSD | Cleared | 15-7-2017 16:12:04 PM | 20-7-2017 13:09:31 PM | 12 Days, 09:06:51 | 15 |
| ② | Steam turbine | T/G #3 BRG VIB-Y | 1X Phase | Out of band | 115 Degrees | 0 / 108 Degrees | Standard | SUSD | Cleared | 15-7-2017 16:12:04 PM | 20-7-2017 13:09:31 PM | 30 Days, 15:40:44 | 301 |
| ① | Steam turbine | T/G #3 BRG Thrust | Direct (Thrust) | Out of band | −36 mil | −34.5 mil | Standard | Running | Cleared | 09-7-2017 16:12:04 PM | 10-7-2017 12:44:56 PM | 0 Days, 20:15:11 | 1 |

FIG. 9

EVENT LIST MANAGEMENT SYSTEM

BACKGROUND

It can be difficult to manually monitor complex machines that have several moving and/or vibrating parts (e.g., turbines, compressors, and the like). Monitoring systems are commonly used to monitor the operation of complex machines, and generate events (e.g., events associated with an alarm) when the machine is not operating as desired. Monitoring systems can include sensors to detect operational information (e.g., operating parameters, operational states, and the like) associated with the machines, and relay a signal to a computing device, which can visually present the operational information for a designated person. For example, a turbine can include an accelerometer that can monitor the motion of blades of a turbine and relay angular velocity measurements to a computer for visualization.

Operational information of a complex machine can include information related to multiple operational parameters and multiple operational states of the machine. Operational states can include a state in which the machine is starting up or shutting down ("startup-shutdown state), a state of normal operation ("running state"), and a state in which the machine is turned off ("machine off state"). The operating parameters of the various operational states can include, turbine angular velocity, machine-part vibration rate, and the like. The computing device can automatically generate events to identify undesirable behavior of the machine, which can transition through multiple operational states. These events can be generated based off of alarm triggers or set points, which can be uniquely configured for the different operational states of a machine. As the machine transitions through multiple operational states, multiple events can be generated for each state. If the generated events are not presented in an easily decipherable manner, a user many not be able to effectively diagnose a problem associated with the machine, or respond effectively.

SUMMARY

In general, apparatus, systems, and methods for managing event lists associated with an alarm are provided.

In one embodiment, a method of event list management system is provided. The method can include accessing data characterizing an operation of a machine. The data can include time durations of a plurality of events associated with the operation of the machine. The plurality of events can share a property. The method can include displaying a first view of the accessed data in a graphical display. The first view can include separate visual representations for each of the plurality of events. The method can also include receiving data characterizing a user input indicative of a view change request. The method can further include determining an aggregate operation time and a number of occurrences of the plurality of events. The method can also include replacing, in the graphical display, the first view with a second view. The second view can include a single visual representation for the plurality of events. The single visual representation can include the determined aggregate operation time and the number of occurrences.

One or more of the following features can be included in any feasible combination.

In one embodiment, the property can be an operational state of the machine. In another embodiment, the property can be an anomalous behavior in the operation of the machine. In yet another embodiment, the property is a system health associated with the operation of the machine. The determined aggregate operation time can be displayed in a first column of the row, and the number of occurrences can be displayed in a second column of the row.

In one embodiment, the single visual representation can be a row in a data table in the graphical display. In another embodiment, the aggregate operation time and the number of occurrences can be determined in response to the user input. In yet another embodiment, the method can include receiving data characterizing a second user input and replacing, based on the second user input, the second view with the first view. In one embodiment, at least one of the accessing, the displaying, the receiving, the determining and the replacing can be performed by at least one data processor forming part of at least one computing system.

In another embodiment, a non-transitory computer program product is provided for storing instructions that can be executed by at least one data processor of at least one computing system. When executed, the instructions can implement operations that can include accessing data characterizing an operation of a machine. The data can include time durations of a plurality of events associated with the operation of the machine. The plurality of events can share a property. The operations can include displaying a first view of the accessed data in a graphical display. The first view can include separate visual representations for each of the plurality of events. The operations can also include receiving data characterizing a user input indicative of a view change request. The operations can further include determining an aggregate operation time and a number of occurrences of the plurality of events. The operations can also include replacing, in the graphical display, the first view with a second view. The second view can include a single visual representation for the plurality of events. The single visual representation can include the determined aggregate operation time and the number of occurrences.

One or more of the following features can be included in any feasible combination.

In one embodiment of the non-transitory computer program product, the property can be an operational state of the machine. In another embodiment, the property can be an anomalous behavior in the operation of the machine. In yet another embodiment, the property is a system health associated with the operation of the machine. The determined aggregate operation time can be displayed in a first column of the row, and the number of occurrences can be displayed in a second column of the row. In another aspect, the operations can include receiving data characterizing a second user input and replacing, based on the second user input, the second view with the first view.

In yet another embodiment, a system is provided having at least one data processor and memory storing instructions which, when executed by the at least one data processor, can cause the at least one data processor to perform operations that can include accessing data characterizing an operation of a machine. The data can include time durations of a plurality of events associated with the operation of the machine. The plurality of events can share a property. The operations can include displaying a first view of the accessed data in a graphical display. The first view can include separate visual representations for each of the plurality of events. The operations can also include receiving data characterizing a user input indicative of a view change request. The operations can further include determining an aggregate operation time and a number of occurrences of the plurality of events. The operations can also include replacing, in the graphical display, the first view with a second view. The second view can include a single visual representation for the plurality of events. The single visual representation can include the determined aggregate operation time and the number of occurrences.

One or more of the following features can be included in any feasible combination.

In one embodiment of the system, the property can be an operational state of the machine. In another embodiment of the system, the property can be an anomalous behavior in the operation of the machine. In yet another embodiment of the system, the property is a system health associated with the operation of the machine. In another aspect of the system, the operations can further include receiving data characterizing a second user input and replacing, based on the second user input, the second view with the first view.

Various aspects of the disclosed subject matter may provide one or more of the following capabilities. Some implementations of event list management system described in this application can allow a machine operator to group triggered events based on one or more properties of the event. For example, the operator can group events with similar event properties into a single event. Some implementations of the event list management system can generate summary statistics of the triggered events. Grouping of similar events and the summary statistics can enhance the operator's ability to efficiently make decisions to improve machine performance.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon It can be desirable to monitor the operation of a machine (e.g., by a network of sensors) and notify a user of an undesired behavior in an operation of the machine. This can be done, for example, by triggering an alarm when an undesired behavior of the machine is detected. A complex machine can have many operational parameters that need to be monitored. This can result in the triggering of multiple alarms at any given time. This can make it difficult for a user to detect a problem in the machine based on patterns of anomalous behavior, or determine a solution for solving the detected problem (e.g., replacing a machine part). This problem can be solved by allowing the user to group (e.g., combine) the triggered alarms ("events") based on a property of the event (e.g., operational state associated with the event, the origin of the event, and the like). Additionally, the user can be provided with statistics associated with an event (e.g., number of times an event has been triggered, total time the machine has operated after the event has been triggered, and the like). The ability to quickly combine and visualize "like" event types as a single event with summary information improves interpretation of operating information. This aggregated view enhances machine operator decision making.

Figure 1:
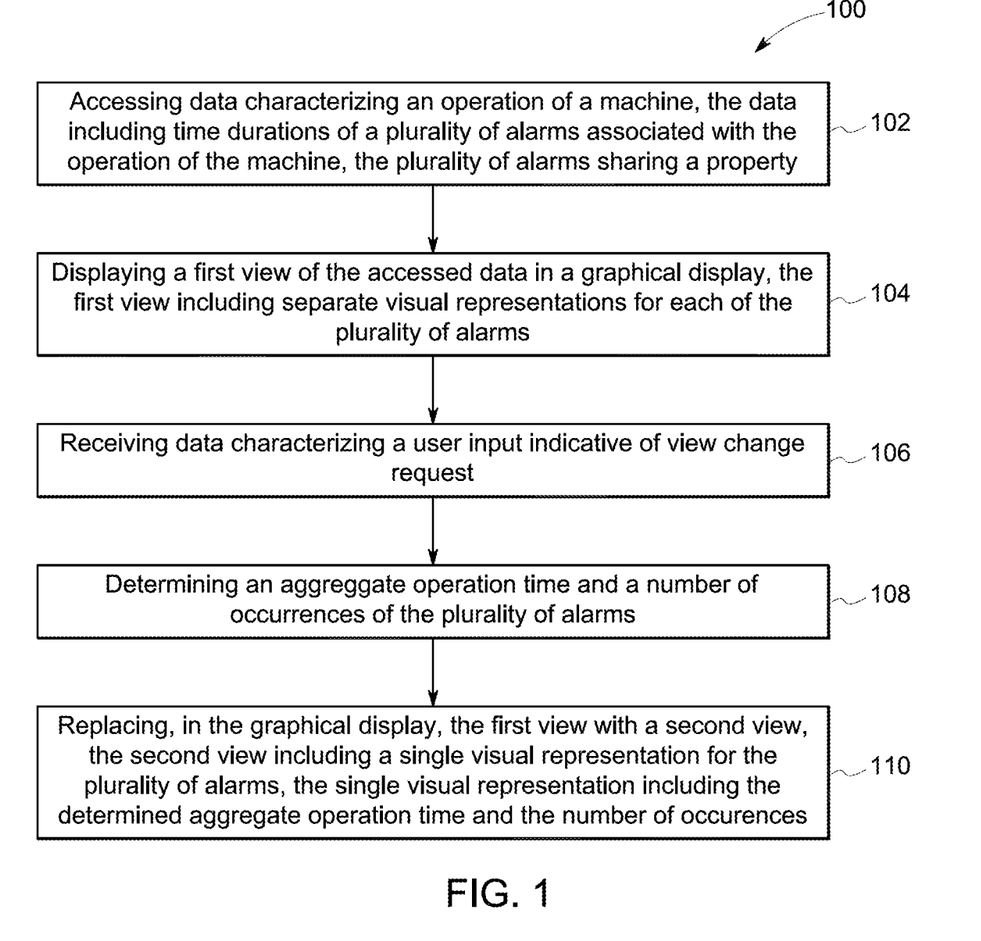
FIG. 1 is a flowchart illustrating an exemplary method for operating an event list management system.

FIG. 1 illustrates an exemplary method of operating an event list management system for use with machines such as industrial equipment (e.g., motors, turbines, oil pumps and the like). At 102, data characterizing an operation of a machine can be accessed. The data can include machine operational information such as operational state of the machine; operational parameters associated with the operational state; timing information associated with the operational parameters (e.g., time of measurement of the operational parameters); time stamps of entry into and exit out of the operational state; information related to transition of the machine through various operational states; and the like.

The data can include information related to events associated with the operation of the machine (e.g., timing information associated with the plurality of events) can be generated and/or selected based on machine operational information. An event can indicate various attributes (e.g., vibration rate of the machine) associated with the operation of the machine. For example, events can provide benchmarks (e.g., maximum/minimum threshold values) that can be used to detect anomalous behavior in the operational parameters. Because the operation of a machine can vary based on the operational state of the machine the benchmarks for detection of anomalous behavior can change with operational state. As a result, events can be operational state dependent.

The events of the machine can have several event properties (e.g., operational state identifier, alarm activity, alarm level, alarm type, and alarm source, and the like). The operational state identifier property can indicate a predetermined operational state of the machine (e.g., "startup-shutdown state," "running state," "machine-off state," and the like) to which the event can be assigned. The alarm activity can be indicative of the current state of the event. For example, if an alarm has exited an alarm condition, the alarm activity can be set to a predetermined value (e.g., "cleared") indicating that the event associated with the alarm is no longer active. If an alarm has not cleared, and the machine is in the operational state associated with the alarm, the alarm activity value can be set to a second predetermined value (e.g., "active"). If an alarm has not cleared, and the machine is not in the operational state associated with the alarm, the alarm activity value can be set to a third predetermined value (e.g., "shelved"), which can indicate that the alarm has been suppressed.

Alarm source can be related to the capabilities of the alarm. For example, if the alarm can be configured to monitor the operation of a machine, the alarm can be referred to as having "condition monitoring" alarm source. On the other hand, alarms that have been configured to shut-down the machine rather than warn and/or notify a user can be referred to as having "protection" alarm source. As another example, another property of an alarm can be an alarm type Alarm type can include, for example, "not communicating," "configuration out of data," "database wrapping," "authentication failure," and the like. Alarm type can also include system health, which can be indicative of the health of the machine.

Multiple events can share event properties. Two or more events can be associated with one operational state and/or have a common value for alarm activity, alarm level, alarm type, alarm source, and the like. For example, data accessed at step 102 can include information (e.g., time durations) of a plurality of events that share one or more alarm properties.

In some implementations, the data can be accessed by a computing device.

Figure 2:
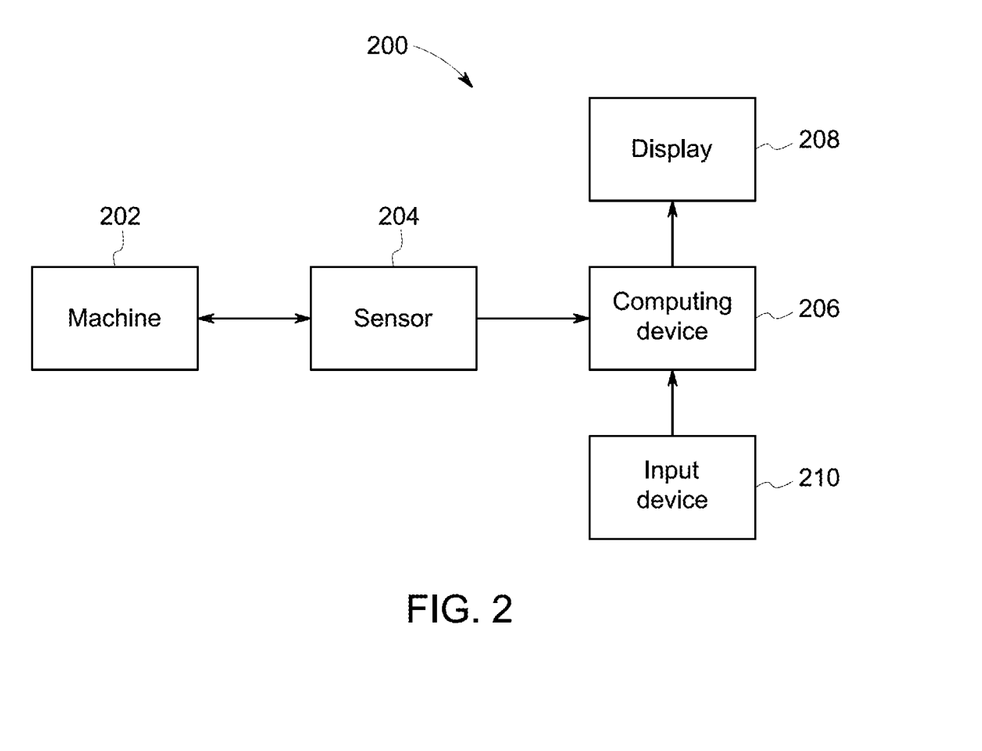
FIG. 2 is a schematic representation illustrating an exemplary embodiment of an event list management system.

FIG. 2 is a system block diagram illustrating an exemplary system 200 that can perform event list management. The system 200 can include a machine 202 (e.g., turbine, motor, oil pump, and the like), a sensor 204 (e.g., accelerometer, position sensor, and the like), a computing device 206 (e.g., laptop, mobile phone, and the like), a display 208 and an input device 210 (e.g., keyboard, mouse, and the like). The sensor 204 can detect operational information of the machine 202, and can relay the detected information to the computing device 206. The computing device 206 can receive and save this information, and can visually present the information on a graphical display space of the display 208. The computing device 206 can also generate/select events, and can graphically present the events on the graphical display space. As described before, an event can include various event properties. The generated and/or selected event and the operational parameters information of the machine 202 can be stored in a memory device. Information associated with the generated and/or selected events (e.g., alarm properties) can be accessed by the computing device 206 (e.g., as described in step 102 of FIG. 1).

Figure 3:
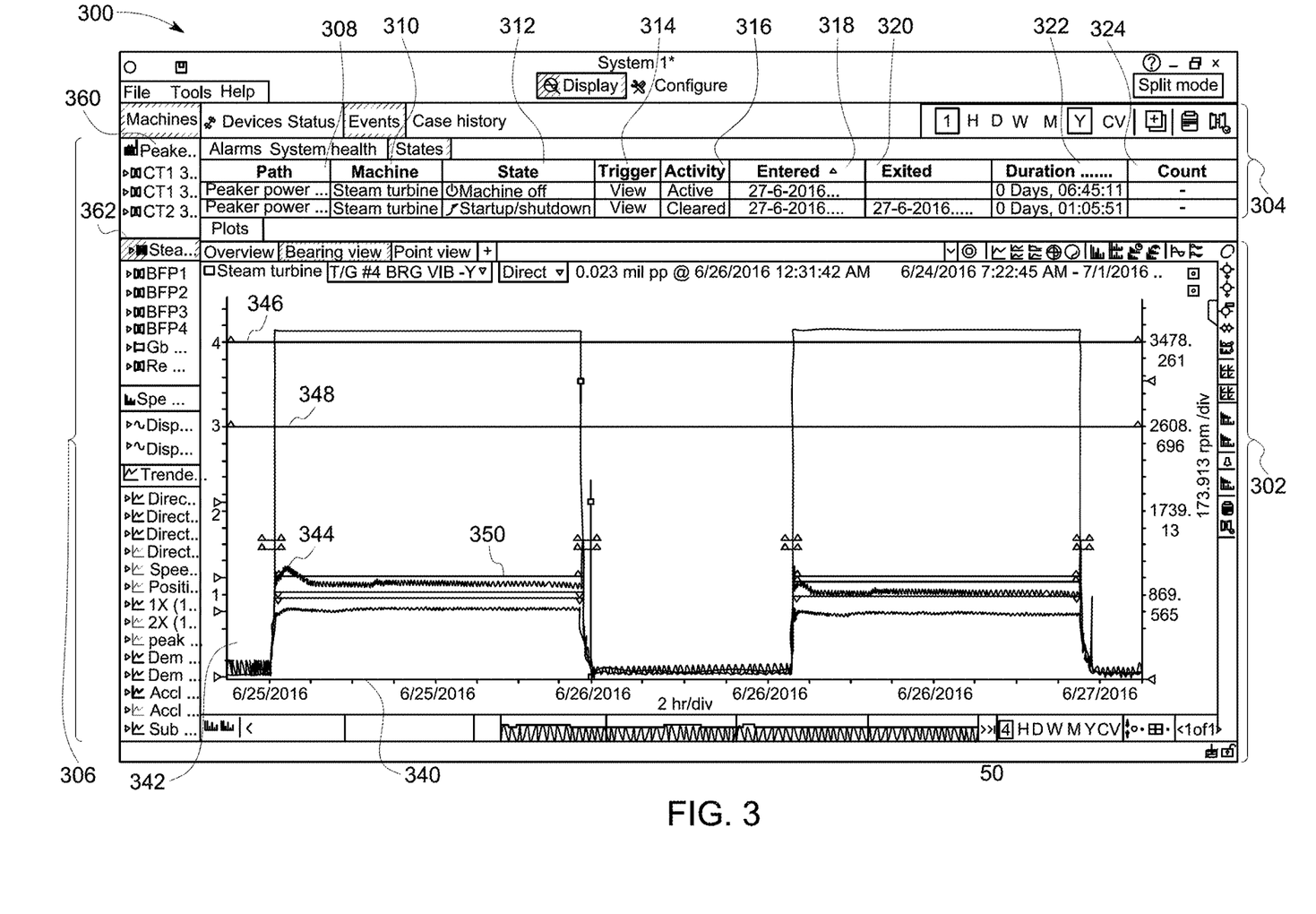
FIG. 3 is a graphical representation illustrating an exemplary graphical display space of an event list management system.

Returning back to FIG. 1, at 104, a first view of the accessed data can be displayed in a graphical display (e.g., a graphical display space of display 208). FIG. 3 illustrates an exemplary graphical display space 300 where information related to the operation of a machine (e.g., plot of operational parameter vs. time, visual representations of alarms, event properties, and the like) can be displayed. For example, the data accessed in step 102 of FIG. 1 can be displayed on a display (e.g., display 208). The graphical display space 300 can include a plot view 302, an event list 304, and a machine list 306.

In the plot view 302, a plot of the machine operational parameters as a function of time can be displayed. The plot view 302 can include a first axis 340 representative of a time related to the detection time of the operational parameter 344. The first axis 340 can also indicate timing information associated with the operational state of the machine, for example, the time at which the machine enters an operational state, the duration of the operational state, and the time at which the machine exits the operational state. The first axis 340 in FIG. 3 can represent the operation of a machine over a configurable time period, such as over the course of several months (e.g., January to August of 2016), weeks, days, hours, and the like.

The plot view 302 can also include a second axis 342 representative of, for example, the value of the operational parameter 344. In addition to the operational parameter 344, the plot view 302 can include graphical objects 346, 348, 350 that represent various alarms set points or triggers (e.g., "over" alarm type, "under" alarm type, "out of band" alarm type, and the like). The alarm set points can be triggered by a computing device (e.g., computing device 206) or selected by the computing device from a database of alarms (e.g., selecting an alarm data structure). The alarm properties can be visually represented by the graphical objects, for example, by color, orientation, shape, size, and location of the graphical objects.

The event list 304 can provide information related to the various events associated with the machine. The event list 304 can also provide information related to the various alarm properties. For example, rows of the event list 304 can be representative of different events and the columns can be representative of the different alarm properties. As shown in FIG. 3, the alarm properties can include alarm path 308, machine associated with alarm 310, alarm operational state 312, alarm trigger 314, alarm activity 316, alarm entry time 318, alarm exit time 320, alarm duration 322 and alarm count 324.

The graphical display space 300 can include a machine list 306 that includes information/identity of the machines associated with the database (e.g., machines that are/have been monitored by the monitoring system). The machines can be organized into categories and subcategories that can allow a machine operator to navigate through the machine list 306. Machine information can be organized in a hierarchy (e.g., a tree structure) that has multiple hierarchical levels. For example, as shown in FIG. 3, the machine list 306 illustrates machines of a peaker power plant 360 that can include machines grouped together into machine categories. For example, the peaker power plant (e.g., first hierarchical level) can include a category for steam turbine 362 (e.g., second hierarchical level).

The peaker power plant 360 and the steam turbine 362 can constitute a hierarchical chain with two hierarchical levels. The hierarchy can be presented in an indented pattern (e.g., hierarchical levels can be indented with respected to the higher and/or lower hierarchical levels). The machine operator can expand or collapse portions of the hierarchical structure by clicking on the icon representing a hierarchical level. For example, by clicking on the icon representing a hierarchical level (e.g., icon for steam turbine 362), icons of lower hierarchy in the hierarchical chain can be collapsed.

Figure 4:
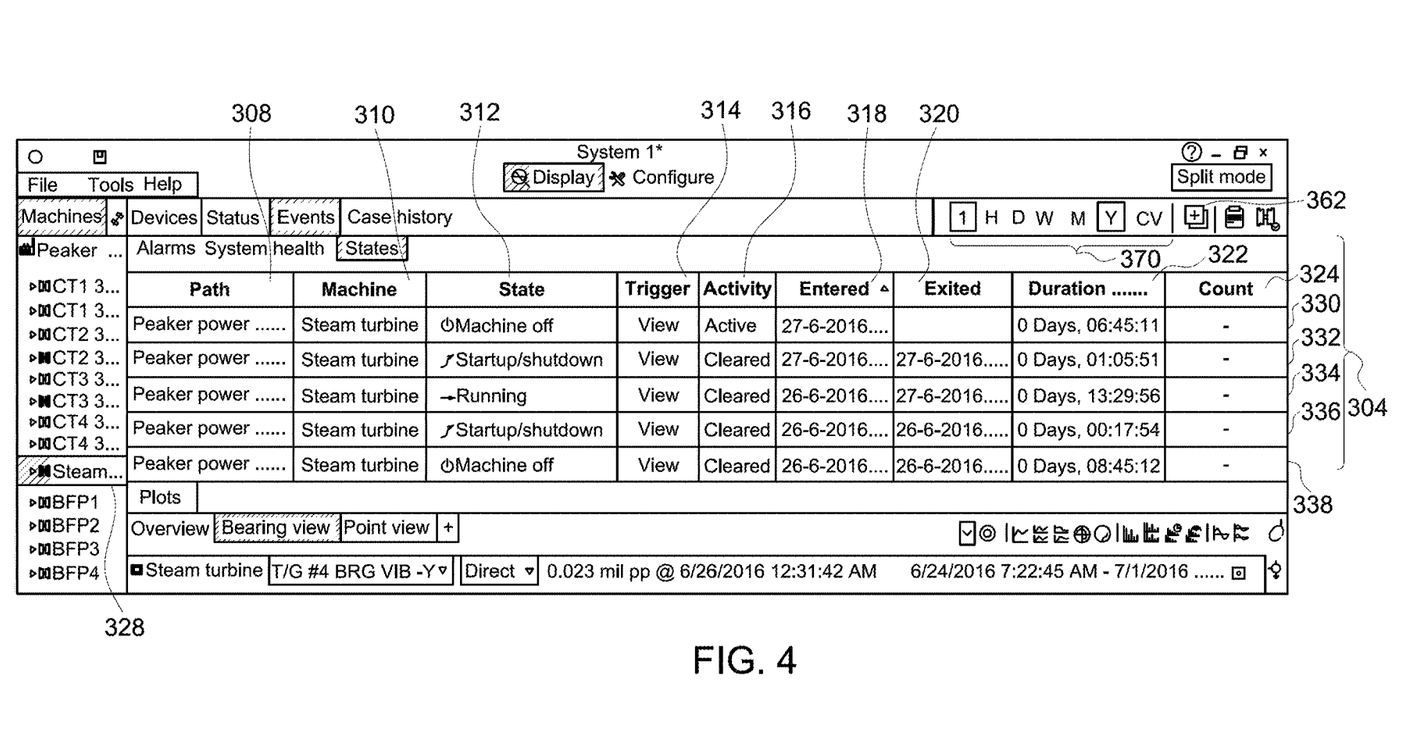
FIG. 4 is a graphical representation illustrating an exemplary expanded event list based on event state of a graphical display space.

In some implementations, a row of the event list 304 can be representative of a unique event. For example, as shown in FIG. 4, rows 330, 332, 334, 336, 338 of the event list 304 are representative of events of steam turbine 328. The events can share one or more alarm properties. For example, row 330 and 338 are representative of "machine-off" operational state, which was entered/exited at different time. Intersections of columns 318, 320 and 322 with the row 330 can provide the time of entry, time of exit, and event duration, respectively, for a first machine-off state. Intersection of columns 318, 320 and 322 and row 338 can provide the time of entry, time of exit, and event duration for a second machine-off state. This can indicate that the steam turbine 328 can transition from a "machine-off" state to different operating states. At one or more time durations after exiting from the "machine-off" state, the steam turbine 328 can return to the "machine-off" state. For a machine operator, it can be desirable to know the number of times a machine (e.g., steam turbine 328) has entered an operational state (e.g., "machine-off" state) and/or the total time duration spent in the operational state.

Embodiments of event list management system described in this application can allow the user to group multiple events that share a common alarm property (e.g., machine operational state, alarm type, and the like), and modify the event list 304 to reflect the grouping. Returning back to step 106 of FIG. 1, data characterizing a user input indicative of a view change request can be received. For example, a user can provide an input through an input device (e.g., input device 210) which can be received by a computing system (e.g., computing device 206). The input can be provided, for example, by clicking on an icon on the display 208 (e.g., icons 362/364 on the display space 300). The icon can be indicative of the alarm property based on which the events can be grouped. In some implementations, the icon can provide the user with multiple alarm properties to choose from. For example, clicking on the icon can provide a dropdown menu from which a desired alarm property can be chosen (e.g., by clicking).

At step 108 of FIG. 1, an aggregate operation time and a number of occurrences of the plurality of events can be determined. A computing device (e.g., computing device 206) can determine a total number of events associated with the alarm property provided/selected by the user. The total number of events can be calculated from the operational data of the machine (e.g., data characterizing the operation of the machine accessed at step 102 of FIG. 1). The computing device can also determine the aggregate operation time of the machine in the selected event. This can be done, for example, by adding the durations of the events that share the selected alarm property. The duration of an event can be presented at the intersection of the row representing the event and alarm duration column 322.

At step 110, the first view (e.g., view of the accessed data displayed at step 104) can be replaced with a second view in the graphical display space (e.g., a graphical display space of display 208). The second view can include a single visual representation for multiple events. For example, the multiple events can share an alarm property (e.g., alarm property, which can be selected at step 108). In one implementation the single visual representation can include a row in the event list 304. If, for example, the user selects operational state as the alarm property based on which the events are to be grouped, the rows in the event list 304 that have a common operational state can be replaced by a single row. The single row can be representative of multiple events associated with an operational state. For example, the first view of the event list 304 that includes rows 330, 332, 334, 336, and 338 (illustrated in FIG. 4) can be replaced by the second view of the event list 304 that includes rows 331, 333, 335, 337, and 339 (illustrated in FIG. 5). Row 331 can represent the single visual representation of events associated with "machine-off" state.

Figure 5:
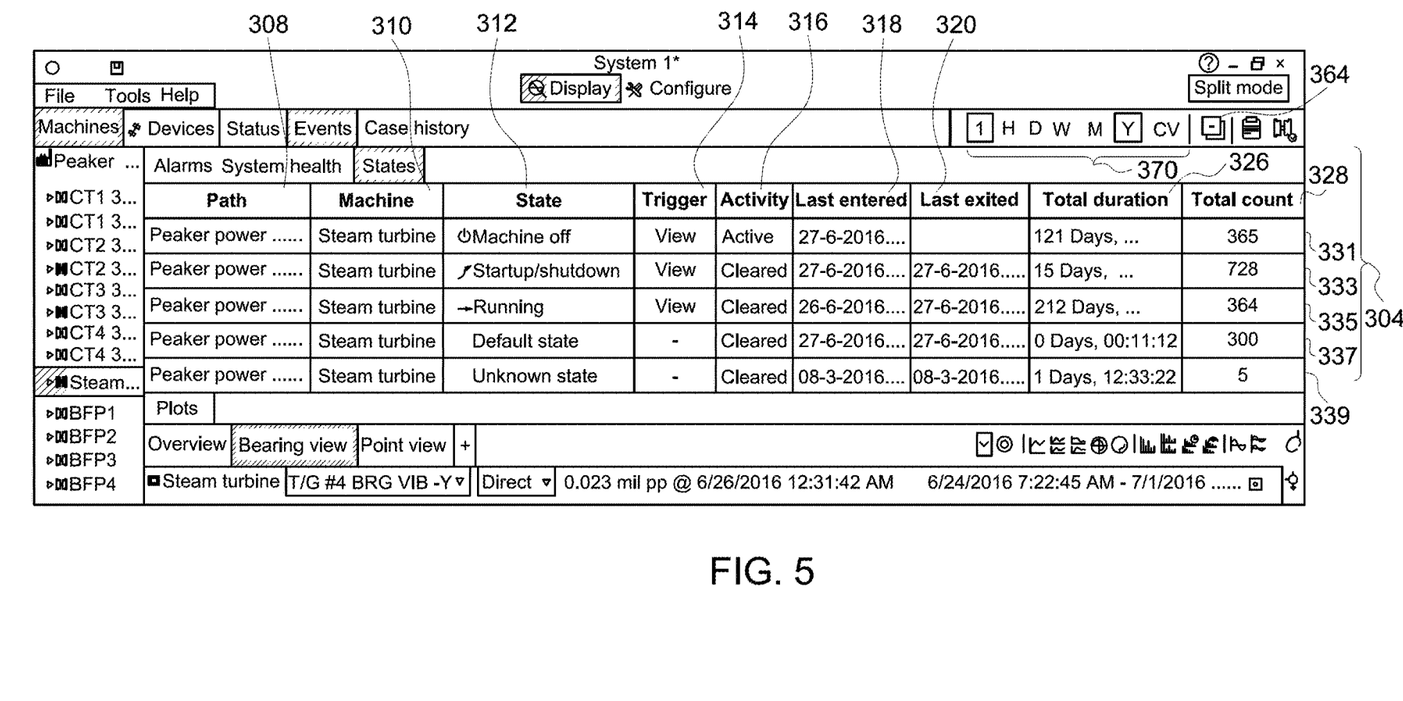
FIG. 5 is a graphical representation illustrating an exemplary collapsed event list of the graphical display space in FIG. 4.

The single visual representation can include the aggregate operation time and the number of occurrence of the event represented by the single visual representation (e.g., events with a common alarm property). As illustrated in FIG. 5, the second view of the event list 304 includes columns for total duration of alarm states 326 and total count of the events 328. Intersection of row 331 and column 326 can present the value of the total time the machine spent in the multiple events represented by the row 331 (e.g., events that represent a "machine-off" state). The total time value can be calculated, for example, by adding the time duration values (e.g., time duration values presented in row 322 of FIG. 4) of the rows representing the multiple events represented by the single visual representation. Intersection of row 331 and column 328 can present the number of events represented by the single visual representation in row 331. For example, in FIG. 5, the value ("365") displayed at the intersection of row 331 and column 328 indicates the number of times events related to a "machine-off" operational state has occurred.

The event list 304 can allow the user to view events that have occurred during a desired time period. For example, the event list can include an icon panel 370 that can allow the user to select a predetermined time period. The selected time period can include, for example previous hour, day, week, month, year, and the like. This can be done by clicking on an icon (e.g., icon from the icon panel 370) representative of the predetermined time period. In some implementations, the user can provide the range of the desired time period (e.g., by entering through the input device 210 a start time and an end time of the time period). The event list 304 may display only the events that have occurred during the time period selected/entered by the user. This can allow the user to develop an understanding of the behavior of the machine (e.g., machine 202) as a function of time. For example, if the machine had developed a problem in January, 2016, it may be desirable to know about the operation of the machine (e.g., alarm events generated) during that time period.

Figure 6:
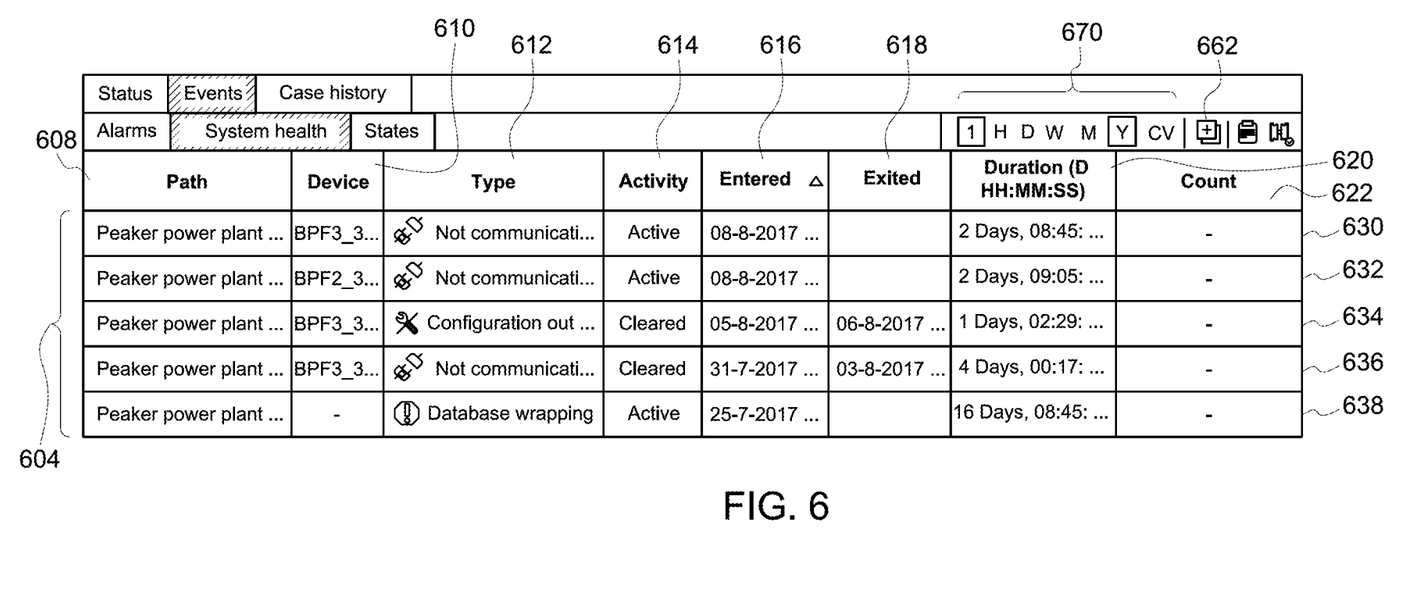
FIG. 6 is a graphical representation illustrating an exemplary expanded event list based on event type of a graphical display space.

FIG. 6 illustrates a graphical representation of a first view an event list 604. The event list 604 includes rows 630, 632, 634, 636, 638 representative of various events associated with one or more machines (e.g., devices BPF3_3500, BPF2_3500, and the like). The event list 604 can include an icon panel 670 that can allow the user to select a predetermined time period (e.g., previous hour, day, week, month, year, and the like). This can be done by clicking on an icon (e.g., in the icon panel 670) representative of the predetermined time period. In some implementations, the user can provide the range of the desired time period (e.g., by entering through the input device 210 a start time and an end time of the time period). This can allow the user to develop an understanding of the behavior of the machine (e.g., machine 202) as a function of time. For example, column 624 can display the cumulative time spent by the machine in a given operational state (e.g., not communicating state) during the selected/entered time period. The event list 604 can include columns representing alarm path 608, alarm device 610, alarm type 612, alarm activity 614, alarm entry time 616, alarm exit time 618, and alarm count 622.

Figure 7:
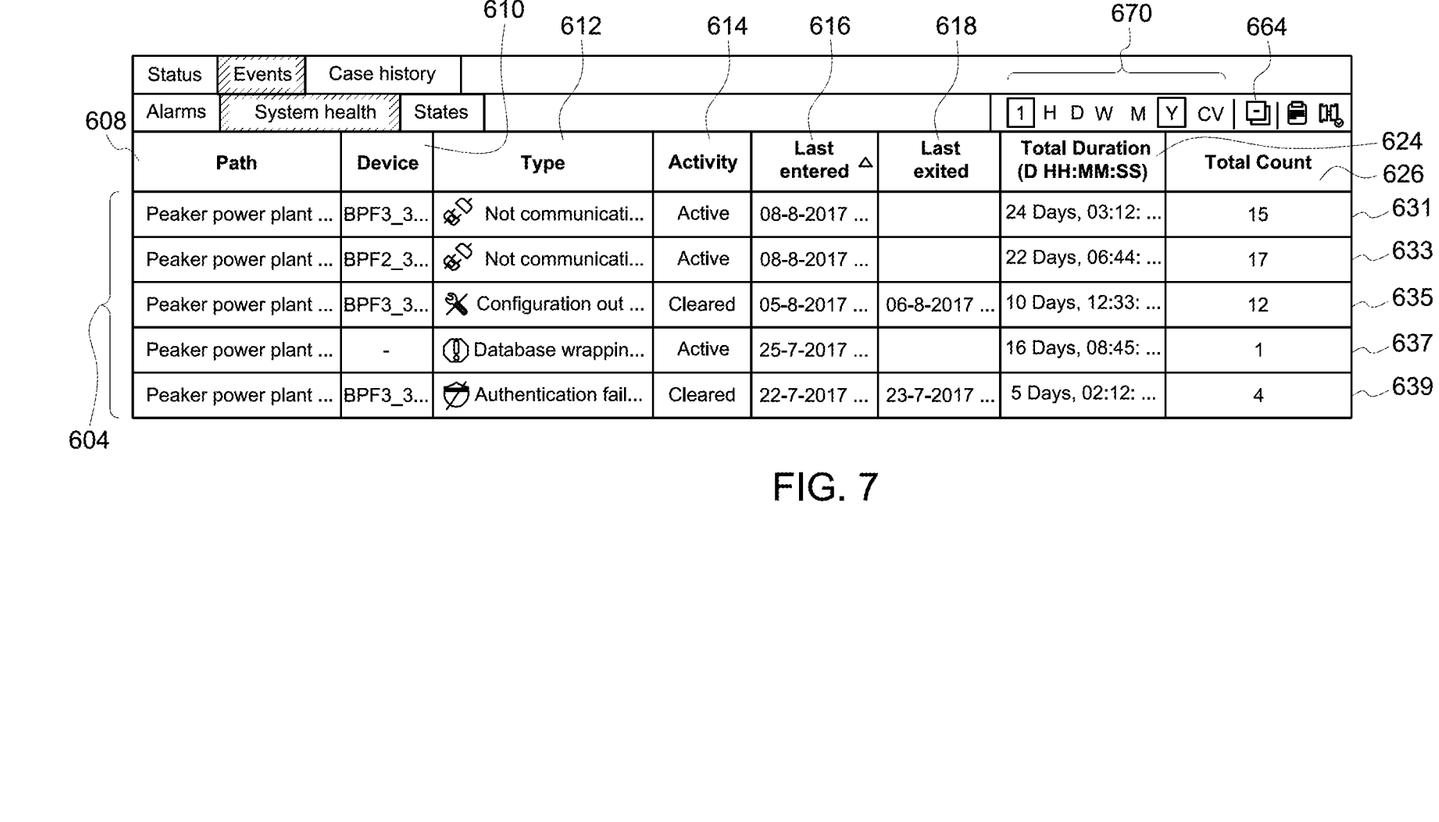
FIG. 7 is a graphical representation illustrating an exemplary collapsed event list based on event type of the graphical display space in FIG. 6.

FIG. 7 illustrates a graphical representation of a second view of the event list 604. The second view can include a single visual representation for multiple events. For example, the multiple events can share the alarm type and the machine associated with the event. The single visual representation can include a row in the event list 604. If, the user selects alarm type and the machine associated with the event as the basis of grouping events, the rows in the alarm 604 that share the alarm type and the associated machine can be replaced by a single row. For example, the first view of the event list 604 that includes rows 630, 632, 634, 636, and 638 (illustrated in FIG. 6) can be replaced by the second view of the event list 604 that includes rows 631, 633, 635, 637, and 639 (illustrated in FIG. 7). Row 631 can represent the single visual representation of events associated with device BPF3_3500 and "not communicating" alarm type.

The single visual representation (e.g., row 631) can include the aggregate operation time and the number of occurrence of the event represented by the single visual representation (e.g., events with a common alarm type and machine associated with the event). As illustrated in FIG. 7, the second view of the event list 604 includes columns for total duration of alarm states 624 and total count of the events 626. Intersection of row 631 and column 624 can present the value of the total time the machine spent in the multiple events represented by the row 631 (e.g., events that represent "not communicating" alarm type for device BPF3_3500). The total time value can be calculated, for example, by adding the time duration values (e.g., time duration values presented in column 620 of FIG. 6) of the rows of the multiple events represented by the single visual representation. Intersection of row 631 and column 626 can present the number of events represented by the single visual representation in row 631. For example, in FIG. 7, the value ("15") displayed at the intersection of row 631 and column 626 indicates the number of times events related to "not communicating" alarm type for device BPF3_3500.

Figure 8:
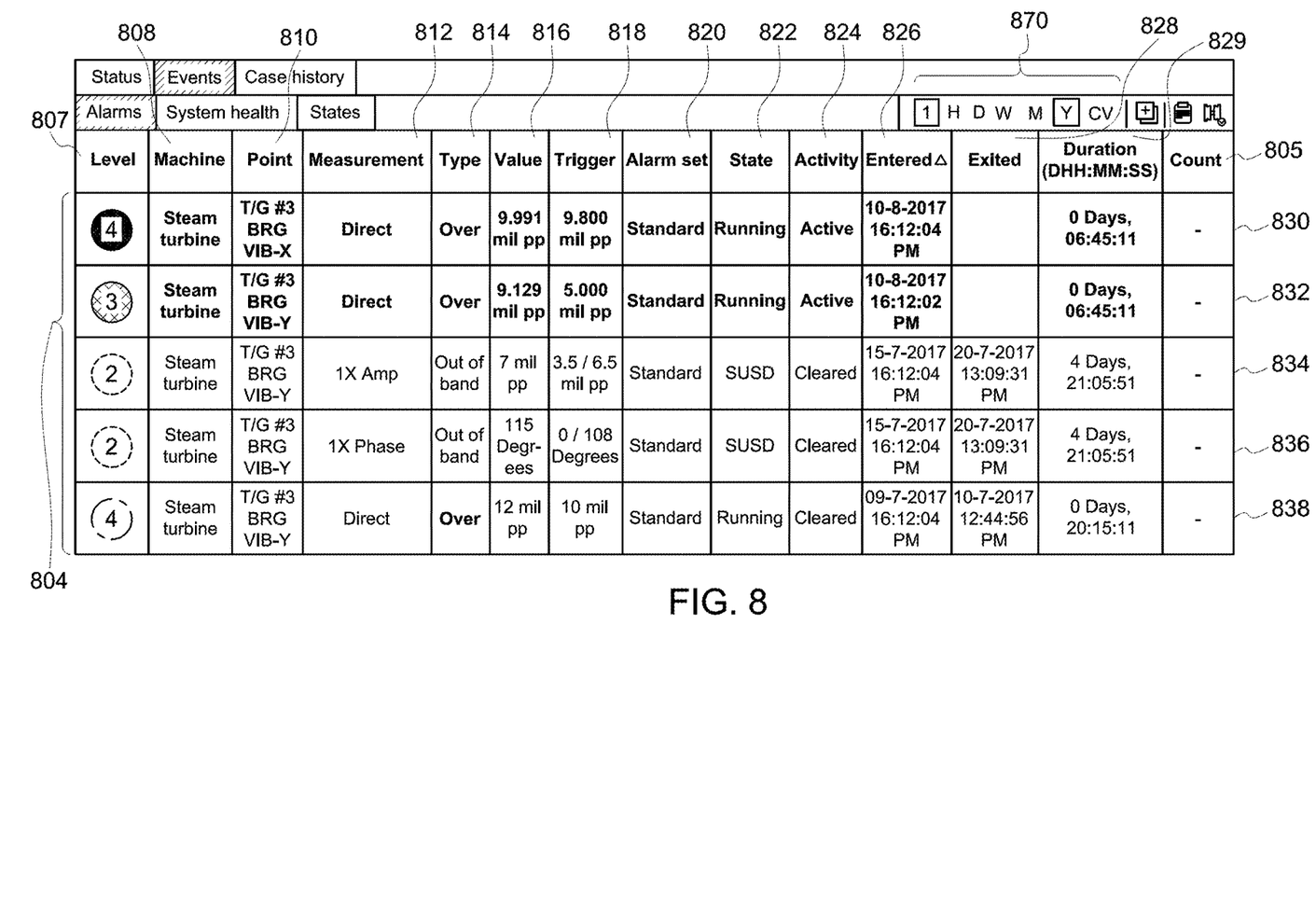
FIG. 8 is a graphical representation illustrating an exemplary expanded event list of a graphical display space.
Figure 9:
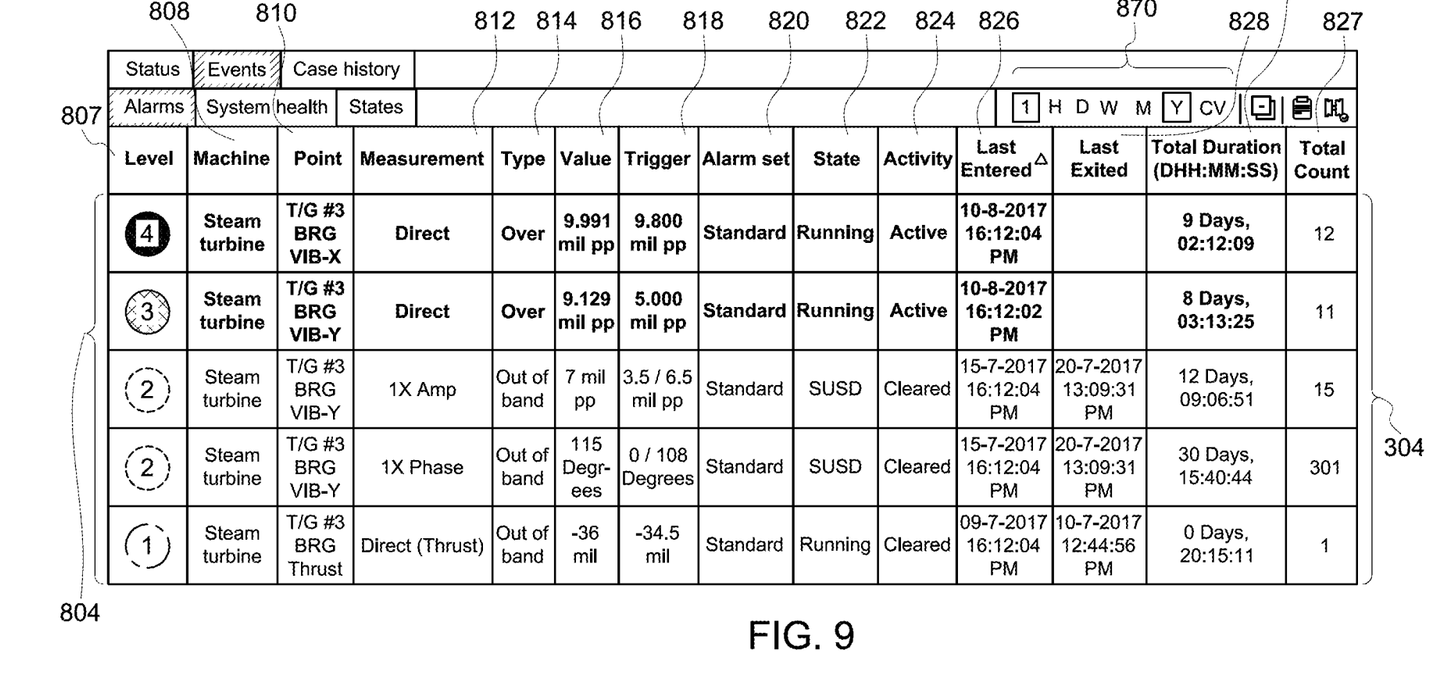
FIG. 9 is a graphical representation illustrating an exemplary collapsed event list of the graphical display space in FIG. 8.

FIGS. 8 and 9 illustrate exemplary graphical representations of event list 804. In FIG. 8, rows 830, 832, 834, 836, 838 of the event list 804 represent a first view of events associated with a steam turbine machine. The first view also includes alarm properties (e.g. alarm level 807, machine associated with alarm 808, alarm point 810, alarm measurement 812, alarm type 814, alarm value 816, alarm trigger 818, alarm set 820, alarm state 822, alarm activity 824, alarm entry time 826, alarm exit time 828, alarm duration 829 and alarm count 805). In FIG. 9, rows 831, 833, 835, 837, 839 of the event list 804 represent a second view of events associated with the steam turbine machine. The second view includes column 825 representative of total time duration and column 827 representative of the number of occurrences of the events represented by a single visual representation of several events (e.g., sharing a common alarm property).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    accessing data characterizing an operation of a machine, the data including time durations of a plurality of alarms associated with the operation of the machine, the plurality of alarms comprising a first set of alarms sharing a first property;
    displaying a first view of the accessed data in a graphical display, the first view comprising a data table including separate rows of the data table for each of the plurality of alarms, wherein the first set of alarms are represented by a first plurality of rows in the data table;
    receiving data characterizing a user input indicative of a view change request;
    determining an aggregate operation time and a number of occurrences of the first set of alarms, wherein the aggregate operation time is a sum of the time durations of the first set of alarms; and
    replacing, in the graphical display, the first view with a second view, the second view including a single row for the first set of alarms, the single row including the determined aggregate operation time and the number of occurrences, wherein the single row replaces the first plurality of rows in the data table.

2. The method in claim 1, wherein the property is an operational state of the machine.

3. The method in claim 1, wherein the property is an anomalous behavior in the operation of the machine.

4. The method in claim 1, wherein the property is a system health associated with the operation of the machine.

5. The method in claim 4, wherein the determined aggregate operation time is displayed in a first column of the replaced row, and the number of occurrences is displayed in a second column of the replaced row.

6. The method in claim 1, wherein the aggregate operation time and the number of occurrences are determined in response to the user input.

7. The method in claim 1, further including:
    receiving data characterizing a second user input; and
    replacing, based on the second user input, the second view with the first view.

8. The method in claim 1, wherein at least one of the accessing, the displaying, the receiving, the determining and the replacing are performed by at least one data processor forming part of at least one computing system.

9. A non-transitory computer program product storing instructions, which when executed by at least one data processor of at least one computing system, implements operations comprising:
    accessing data characterizing an operation of a machine, the data including time durations of a plurality of alarms associated with the operation of the machine, the plurality of alarms comprising a first set of alarms sharing a first property;
    displaying a first view of the accessed data in a graphical display, the first view comprising a data table including separate rows of the data table for each of the plurality of alarms, wherein the first set of alarms are represented by a first plurality of rows in the data table;
    receiving data characterizing a user input indicative of a view change request;
    determining an aggregate operation time and a number of occurrences of the first set of alarms, wherein the aggregate operation time is a sum of the time durations of the first set of alarms; and
    replacing, in the graphical display, the first view with a second view, the second view including a single row for the first set of alarms, the single row including the determined aggregate operation time and the number of occurrences, wherein the single row replaces the first plurality of rows in the data table.

10. The computer program product of claim 9, wherein the property is an operational state of the machine.

11. The computer program product of claim 9, wherein the property is an anomalous behavior in the operation of the machine.

12. The computer program product of claim 9, wherein the property is a system health associated with the operation of the machine.

13. The computer program product of claim 12, wherein the determined aggregate operation time is displayed in a first column of the replaced row, and the number of occurrences is displayed in a second column of the replaced row.

14. The computer program product of claim 9, the operations further comprising:
    receiving data characterizing a second user input; and
    replacing, based on the second user input, the second view with the first view.

15. A system comprising:
    at least one data processor;
    memory storing instructions which, when executed by the at least one data processor, causes the at least one data processor to perform operations comprising:
    accessing data characterizing an operation of a machine, the data including time durations of a plurality of alarms associated with the operation of the machine, the plurality of alarms comprising a first set of alarms sharing a first property;

displaying a first view of the accessed data in a graphical display, the first view comprising a data table including separate rows of the data table visual for each of the plurality of alarms, wherein the first set of alarms are represented by a first plurality of rows in the data table;

receiving data characterizing a user input indicative of a view change request;

determining an aggregate operation time and a number of occurrences of the first set of alarms, wherein the aggregate operation time is a sum of the time durations of the first set of alarms; and replacing, in the graphical display, the first view with a second view, the second view including a single row for the first set of alarms, the single row including the determined aggregate operation time and the number of occurrences, wherein the single row replaces the first plurality of rows in the data table.

16. The system of claim 15, wherein the property is an operational state of the machine.

17. The system of claim 15, wherein the property is an anomalous behavior in the operation of the machine.

18. The system of claim 15, wherein the property is a system health associated with the operation of the machine.

19. The system of claim 15, the operations further comprising:

receiving data characterizing a second user input; and replacing, based on the second user input, the second view with the first view.

* * * * *